United States Patent [19]

Rough, Sr. et al.

[11] 4,100,680

[45] Jul. 18, 1978

[54] SENSING THE LEVEL OF MOLTEN GLASS IN A TANK

[75] Inventors: Robert R. Rough, Sr., Toledo; Homer D. F. Peters, Sylvania, both of Ohio

[73] Assignee: Owens-Illinois, Inc., Toldeo, Ohio

[21] Appl. No.: 792,758

[22] Filed: May 2, 1977

[51] Int. Cl.² .......................... G01B 5/18; G01F 23/04
[52] U.S. Cl. ............................................... 33/126.7 A
[58] Field of Search .......................... 33/126, 126.7 A; 214/18.2

[56] References Cited

U.S. PATENT DOCUMENTS

| | | | |
|---|---|---|---|
| 2,032,016 | 2/1936 | Hitner | 33/126.7 A |
| 2,896,686 | 6/1959 | Roberson et al. | 33/126.7 A X |
| 3,054,188 | 9/1962 | Cupido et al. | 33/126.7 A |
| 3,213,670 | 10/1965 | Macgeorge | 214/18.2 X |
| 3,233,756 | 2/1966 | Penberthy | 214/18.2 |

FOREIGN PATENT DOCUMENTS 271,047  8/1970  U.S.S.R. .......................... 33/126.7 A

Primary Examiner—Charles E. Phillips
Attorney, Agent, or Firm—D. T. Innis; Myron E. Click; David H. Wilson

[57] ABSTRACT

In the operation of a contact-type probe for sensing the level of glass in a tank or furnace, an arrangement is provided which will move the probe into contact with this molten glass at a relatively slow rate. After contact with the glass, the probe is quickly withdrawn from contact with the molten glass, the quick withdrawal being provided in the two embodiments. The first, by exhausting air from a diaphragm motor used to advance the probe and in the other embodiment electrically retracting the probe by the use of a solenoid.

2 Claims, 4 Drawing Figures

SENSING THE LEVEL OF MOLTEN GLASS IN A TANK

BACKGROUND OF THE INVENTION

This invention is for the purpose of providing a more sensitive and reliable mechanism for determining the precise level of the surface of a bath of molten glass in a furnace or tank holding the glass. It is desirable to know the level of the glass in a melter, either for indicating purposes, or for the purpose of controlling the addition of batch ingredients to the tank so as to maintain a fairly constant supply of glass in the melter. Melters used for supplying glass to bottle-forming machines are of the continuous melting type, where batch ingredients are added to the surface of the molten glass at one end of the melter, with the totally melted glass exiting from an opposite end. This end of the melter connected to a refiner and forehearth from which glass, in the form of gobs, will be sent to machines which form them into bottles. Most modern glass plants operate 24 hours a day, 7 days a week, thus different shifts of personnel will be in charge of the melters and feeding of glass to machines.

It is important in order to produce constant good glass, too, that the level of glass is being generally maintained within closely defined limits. This is most certainly true with regard to the glass in the feeder since the weight and size of the gobs formed by the feeder are definitely influenced by the depth of the glass in the feeder. A prior art example of a glass level gauge is U.S. Pat. No. 2,628,428 dated Feb. 17, 1953. In this patent, a water-cooled electric probe is moved into and out of contact with the molten glass under the control of a reversible motor. The speed of the motor is relatively constant while driving the probe into contact with the glass or when moving the probe away from the glass.

Another example of a glass level gauge may be found in U.S. Pat. No. 2,645,749 dated July 14, 1953. In the system described in this patent, two probes are permanently mounted at different levels and extend through the wall of the glass tank. The probes are set with their lower ends at slightly displaced vertical positions. Sensing of the level of glass by one or both probes results in the completion of electrical circuits so as to fire one or both thyratrons which, in turn, effectively operate relays. The relays operate switches which control the operation of one or more batch feeders.

SUMMARY OF THE INVENTION

Method and apparatus for gauging the level of molten glass in a tank wherein an electrode is driven into contact with the electrically conductive molten glass completing an electrical circuit in which the probe and the driving means are an integral part. The completion of the circuit provides a signal to a control system which immediately reverses the movement of the probe, and the instantaneous position of the probe, on contact, is recorded. Predetermined set points are provided for comparison with the measured signals and control functions may be carried out in response to the comparisons to maintain the glass level at a predetermined position.

DETAILED DESCRIPTION OF THE DRAWINGS

Figure 1:
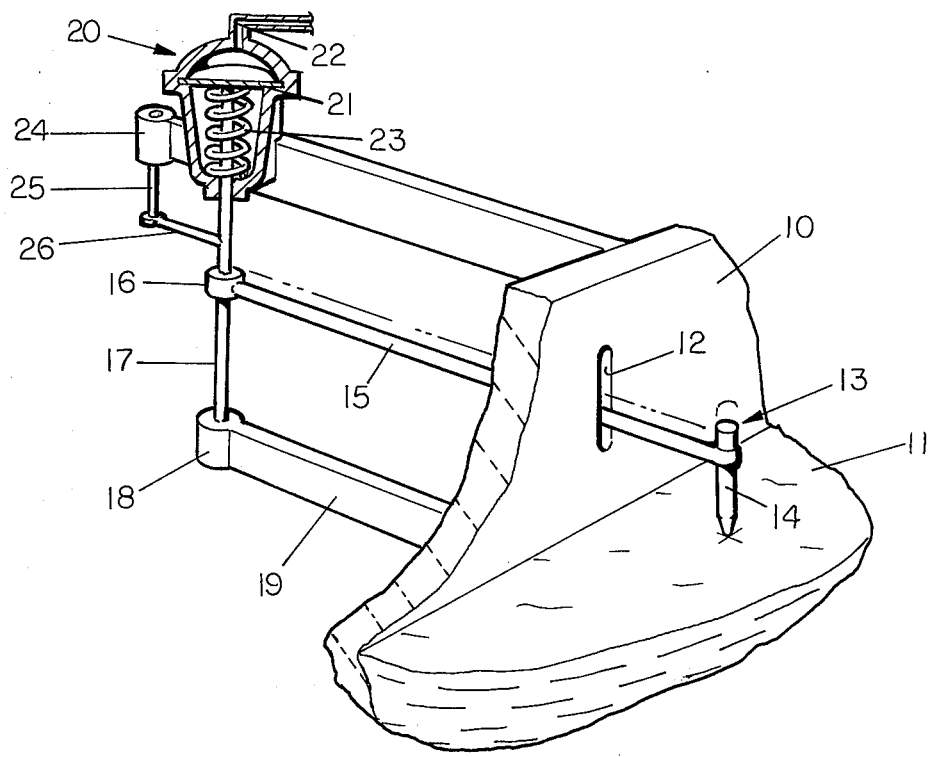
FIG. 1 is a perspective view of one embodiment of the invention.

With particular reference to FIG. 1, there is shown a sidewall 10 of a glass melting furnace. A bath of molten glass is shown at 11. The sidewall 10 is provided with a vertically elongated slot 12. The slot 12 is positioned and has a length relative to other normal probes of the level of the glass in the furnace, as will be explained later to accommodate vertical reciprocation of a level sensing probe 13.

Figure 2:
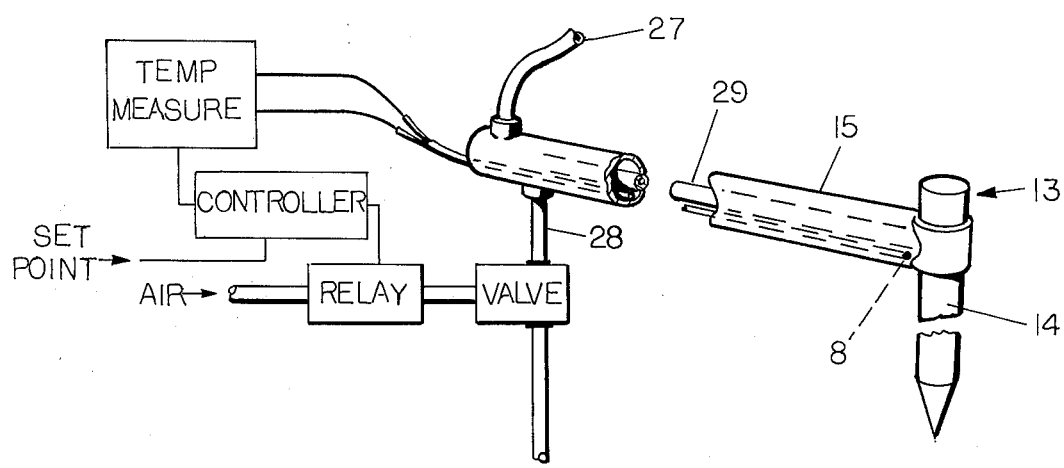
FIG. 2 is a perspective view on an enlarged scale of the water-cooled probe of FIG. 1 with temperature regulation thereof.

The probe 13, shown specifically in greater detail in FIG. 2, comprises a vertically extending platinum contactor 14. The contactor 14 is mounted to the extending end of a tubular arm 15 and can best be seen in FIG. 1. The tubular arm extends through slot 12 to a remote position where it is clamped or fixed at 16 to a vertically extending actuating rod 17. The lower end of the rod 17 extends into a bushing 18 which is supported by a horizontal bar 19. The upper end of the rod 17 extends into the interior of a diaphragm motor housing 20. As the name implies, the housing 20 contains a horizontal diaphragm 21 which effectively divides the housing into an upper and lower chamber. The upper chamber has an air inlet 22 connected thereto. The lower chamber housing guides the upper end of rod 17, with a coil spring 23 in surrounding relationship with respect to the upper end of the rod 17. The rod 17, actually pictured, is secured to the center of the diaphragm 21 and, as would be expected, introduction of air under pressure through the inlet 22 will cause the diaphragm 21 to flex downwardly moving the rod 17 and, in turn, lowering the probe 13 toward the glass level 11. Release of air from the upper chamber will result in the spring 23 quickly reversing the position of the diaphragm 21 forcing the diaphragm upwardly and, in turn, raising the probe 13 away from the glass level 11. The actual position of the probe may be monitored by the use of a linear variable differential transformer 24 having its windings being fixed in relation to the motor housing 20 while the movable core thereof is connected to a shaft 25 which, in turn, is connected to the rod 17 by an arm 26. It can thus be seen that vertical movement of the rod 17 will be accurately reflected by the movement of the transformer core.

As can be seen specifically in FIG. 2, the arm 15 is hollow and is provided with a pair of flexible connections 27 and 28. The connection 28 communicates with a co-axial tube 29 through which cooling water may flow, thus effectively cooling the arm 15. Thermocouple 8 senses the temperature.

Figure 3:
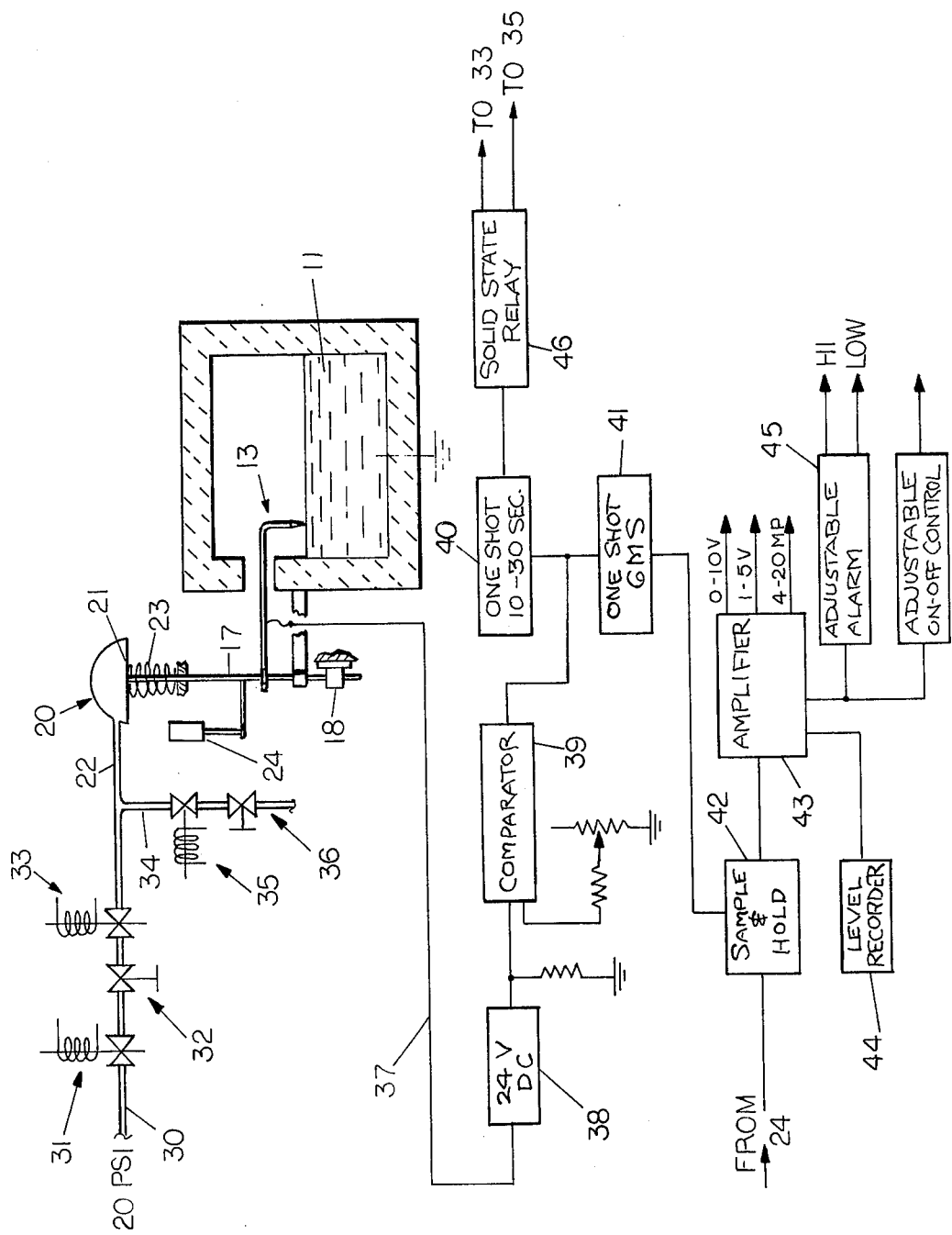
FIG. 3 is a schematic circuit diagram of the control system for the apparatus of FIG. 1.

FIG. 3 is the electrical and pneumatic schematic drawing of the operation of the apparatus which is shown in FIGS. 1 and 2.

The pneumatic system for moving the probe 13 comprises a source of air under pressure fed to a line 30. A first, normally closed, solenoid valve 31 is positioned in advance of a throttle valve 32. A normally opened solenoid value 33 in the line 30 is connected to the air inlet 22 to the motor 20. A branch line 34 connects the line 30 to atmosphere through a normally closed solenoid valve 35 and throttle valve 36. The molten glass in the tank is connected to a ground, while the probe 13 has an electrical conductor 37 connected thereto.

It should be understood that molten glass is conductive so that when the probe tip touches the surface of the molten glass, a circuit will be completed through the probe to the ground. The lead 37 is connected to a 24-volt direct current source 38. There are two electrical interferences which must be overcome in order to provide an accurate indication of the probe touching the glass, one of these interferences is the quiescent conductance of the gas between the probe and glass, and the other is the electrical voltage which may be induced by current used to electrically heat the furnace. Both of these interferences are avoided by using a comparator 39 which has a reference voltage above that which may be produced by the interferences. The value of the voltage used to signal the contact is made large enough so that it dwarfs any interference voltage and is thereby the only voltage which actuates the comparator.

The output of the comparator 39 goes to a one-shot 40 and one-shot 41. The one-shot 41 has a sampling period of 6 milliseconds, and is connected to a sample and hold circuit 42. The output of the LVDT 24 is connected to the sample and hold circuit 42. The sample and hold circuit 42 is connected to an amplifier 43. The amplifier, in turn, may be connected to a level recorder 44 and an adjustable alarm 45. One-shot 40 operates through a solid state relay 46, the solenoid valves 33 and 35. It can readily be seen that upon actuation of both of these valves, normally open valve 33 be closed, and the normally closed valve 35 will be opened resulting in a rapid exhaustion of air within the motor 20 to the atmosphere. The next cycle of operation is delayed. The normally closed solenoid valve 33, obviously, is open, as is the starting valve 31.

The throttle valve 32 functions to control the rate of introduction of air to the motor 20. In this manner the movement of the probe toward the surface of the hot glass in the melter may be controlled. With the solenoid valve operated, the probe will be pulled from contact with the glass by the heavy spring 23. Each cycle of the probe into and out of contact with the hot glass will be recorded by the level recorder 44.

As previously stated, the prime mover of the contact probe 13 is a diaphragm motor 20. Full travel of the probe is approximately 1 inch which is consistent with the present furnace level sensor that is accurate within the range of plus or minus ½ inch. By the mechanism described, there is provided a slow approach of the probe to the glass and a rapid retraction. In this manner the overshoot or advance of the probe after contact is reduced to a minimum, and the penetration into the glass is aproximately 0.010 inch or less. Time of contact is in the range of 16–50 milliseconds. Contact of the probe with the glass is indicated by a completed electrical circuit. The slow approach and rapid retraction is accomplished by throttling the air to the diaphragm and then quickly exhausting it when the glass contact is sensed. The position of the probe is measured by the LVDT, the output of which is sampled at the moment of glass contact and the value is retained until the next contact is made. At the time of probe contact with the glass, the completion of the electrical circuit causes a time delay to be initiated, the sample and hold function to operate and the exhaust valves to open. The time between samples is determined by the time delay which retains the probe in the withdrawn position and by the probe's approach speed which is governed by the input air throttling valve 32. The retraction speed is governed by exhaust throttle valve 36, and this valve permits rapid retraction without damage to the actuator. In the event power would be interrupted, valve 31, which is normally closed, will open and exhaust the air in the line 22, thereby retracting the probe in this situation. This, in effect, protects the probe against the possibility of cycling into the glass and not being retracted with the AC power would be interrupted.

Figure 4:
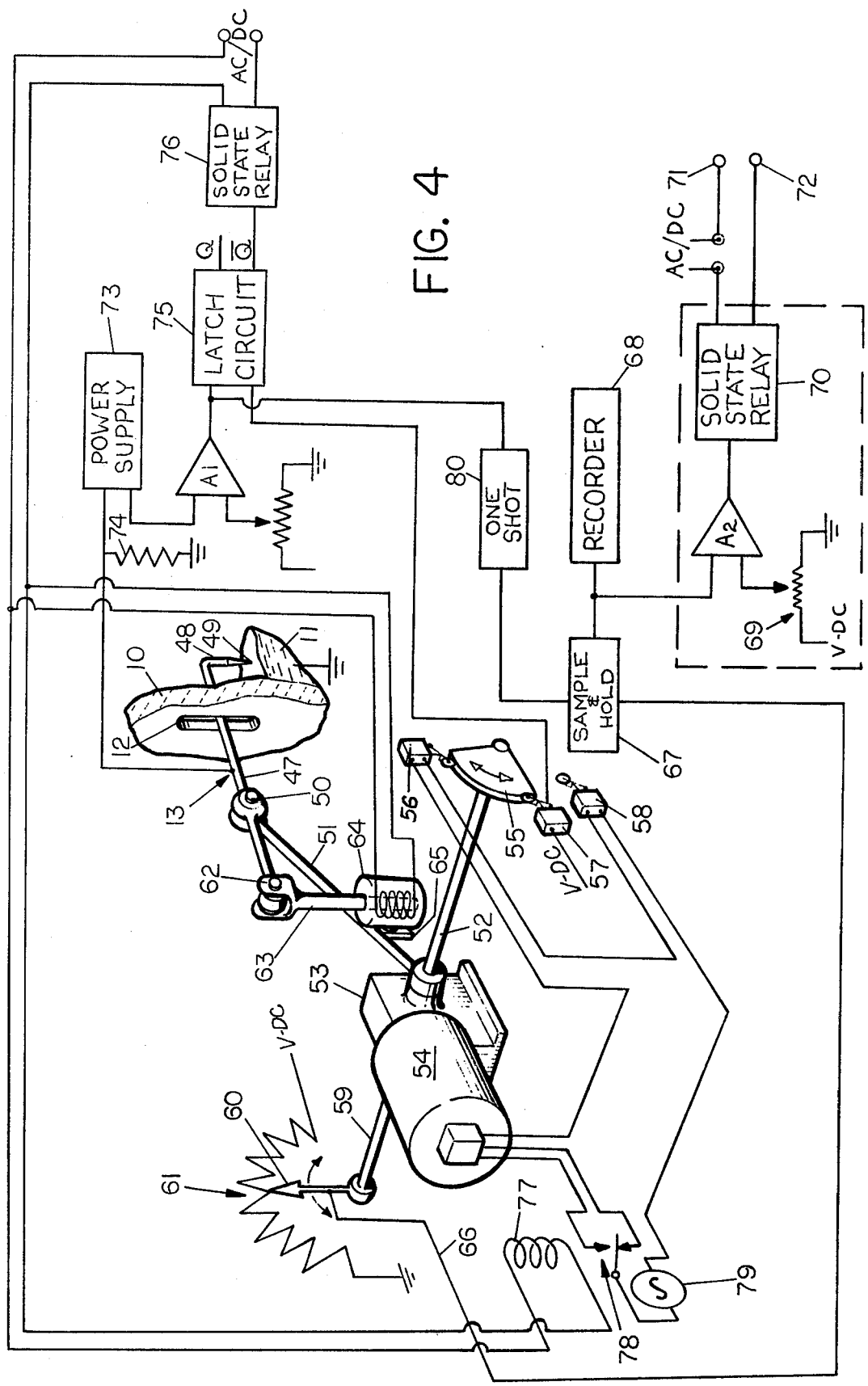
FIG. 4 is a schematic circuit diagram of a second embodiment of the control system and apparatus.

Turning now to FIG. 4, there is shown a second embodiment of a molten glass level sensing apparatus which may utilize the water cooled probe shown in FIG. 2. In this embodiment, the probe, generally designated 13, takes the form of an elongated arm 47 with a down-turned end 48 having a tip 49 at the extreme end thereof. The arm 47 is pivotally connected at 50 to the upper end of an operating arm 51. The lower end of the operating arm 51 is radially connected to a horizontal drive shaft 52. The drive shaft 52 is the output drive from a gear box 53 which is operated by a reversible motor 54.

As in the embodiment schematically shown in FIG. 1, the probe arm 47 extends through the vertical slot 12, similar to that shown in FIG. 1, formed in the wall 10 of a melting furnace containing molten glass 11. The glass 11, as schematically shown, is provided with an electrical ground. The drive shaft 52 extends to the right, as shown in FIG. 4 and has a switch-operating cam 55 at the end thereof which is adapted to operate limit switches 56, 57 and 58, depending upon the angular position of the cam relative to the axis of the shaft 52. The limit switches 56 and 58 are provided to stop overrides in the event of circuit failure. The shaft 52 has an extension 59 which serves to move a wiper 60 of a rheostat 61. The end of the arm 47 opposite to the end 48 is rotatably connected to a clevis 62 on the end of a generally vertically extending shaft 63. The shaft 63 at its lower end carries an armature for a solenoid 64. The solenoid 64 has its outer casing, which supports the coil, pivotally mounted to a tab 65 which is connected to the arm 51.

The wiper 60 of rheostat 61 has a lead 66 connected thereto which is connected to a "sample and hold" circuit 67. The sample and hold circuit 67 functions in the same manner as the sample and hold circuit 52 in the FIG. 3 embodiment providing a retained value output to a recorder 68 and the input to an amplifier $A_2$. The amplifier $A_2$ is biased by a voltage divider 69. The output from the amplifier $A_2$ is connected to a solid state relay 70. The relay 70 will complete a circuit from the AC or DC power source to a pair of terminals 71 and 72 to which may be connected a control element (not shown). The position of the wiper 60 relative to the rheostat or resistance 61, will depend upon the level of the molten glass 11 within the furnace or tank. The probe 13 is connected to a power supply 73. Resistor 74 provides sufficient bias level to permit the sensing of the conductive molten glass 11 by the probe tip 49 so as to provide a signal from the power supply 73 through amplifier $A_1$ to a latch circuit 75. A time delay is initiated by contacting of the probe with the glass. Depending upon the signal level in the latch circuit 75, a solid state relay 76 will complete a circuit from a suitable AC or DC source to a coil 77 to operate a reversing switch 78 connected to the motor 54. The switch 78 is connected to a source 79 of alternating current. DC voltage fed to the switch 57 will reset the latch circuit 75 when the switch is actuated. The two switches 56 and 58 are shown in series and function to maintain the motor 54 and its output shaft such that the probe 13 is oscillated vertically within limits by the arm 51. Upon the completion of the circuit through the probe, amplifier $A_1$ will operate the latch circuit 75 which in turn fires a one shot 80 which has an output of approximately 1 millisecond which triggers the sample and hold circuit 67 to set the output signal for the recorder 68. At the same time that the solid state relay 76 is operated due to the completion of the circuit through the grounded glass 11, the signal used to operate the reversing switch 78, also operates the solenoid 64 which results in the immediate downward mechanical movement of the shaft 63 resulting in the instantaneous retraction of the probe tip 49 from the glass level.

With the operating system as described, it can be seen that the probe will approach the glass to a controlled rate until such time as it touches the glass, at which time the motor is reversed for raising the probe also at this time the probe is pivoted about the pivot 50 by the solenoid 64 resulting in the probe immediately breaking the circuit.

With this arrangement, the output of the "sample and hold" 67 is precise and provides a more accurate reading of the actual level of the glass between cycles of the approach and touching and reversing compared to those systems which cyclically function mechanically or are operated at slower rates of withdrawal. Frequently, these systems draw a thread of glass and the thread, as time goes by, may become quite heavy resulting in inaccuracy in the actual sensing of the level to the degree believed necessary to control and sense the level of molten glass in more sophisticated control systems.

We claim:

1. Apparatus for gauging the level of molten glass in a tank, comprising:
    an electrical sensing probe;
    a reversible electric motor;
    operating connections between the probe and the motor for moving the former into and out of contact with the molten glass;
    a motor control connected to said motor for reversing the operation of said motor upon contact of said probe with the molten glass in said tank;
    solenoid means connected to said probe, said solenoid means being carried by an arm;
    means driving said arm from said motor;
    means pivotally mounting said probe to said arm; and
    means connecting said probe to the armature of said solenoid for rapidly moving said probe out of contact with the molten glass.

2. The apparatus of claim 1, comprising circuit means connected between said probe and said solenoid whereby completion of a circuit through the glass results in immediate withdrawal of the probe from the glass surface.

* * * * *